(No Model.) 4 Sheets—Sheet 1.
O. B. FAHNEHJELM.
SUPPORT FOR HOLDING AND ADJUSTING INCANDESCING BODIES IN A GAS FLAME.
No. 332,650. Patented Dec. 15, 1885.
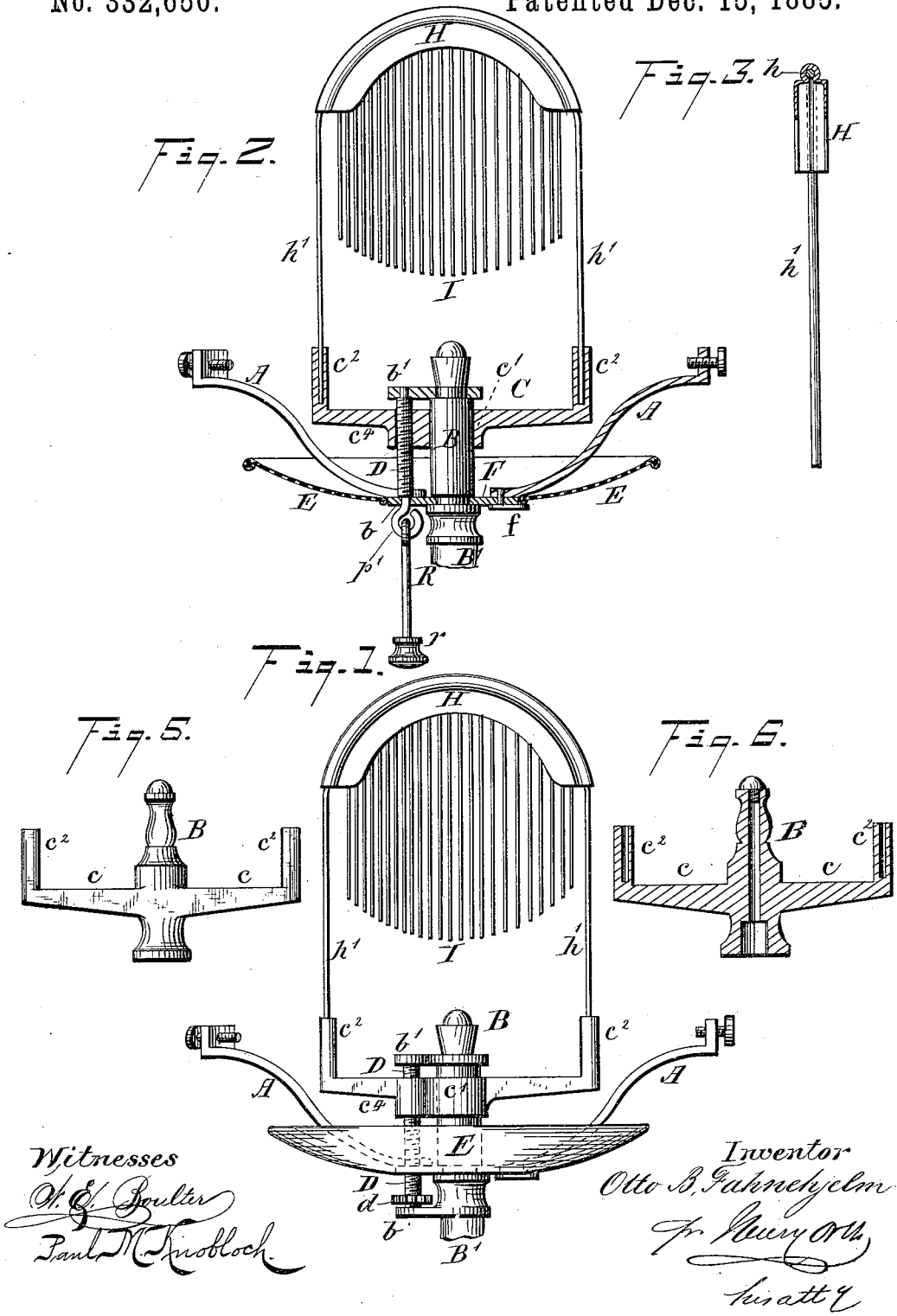
Witnesses
Inventor
Otto B. Fahnehjelm

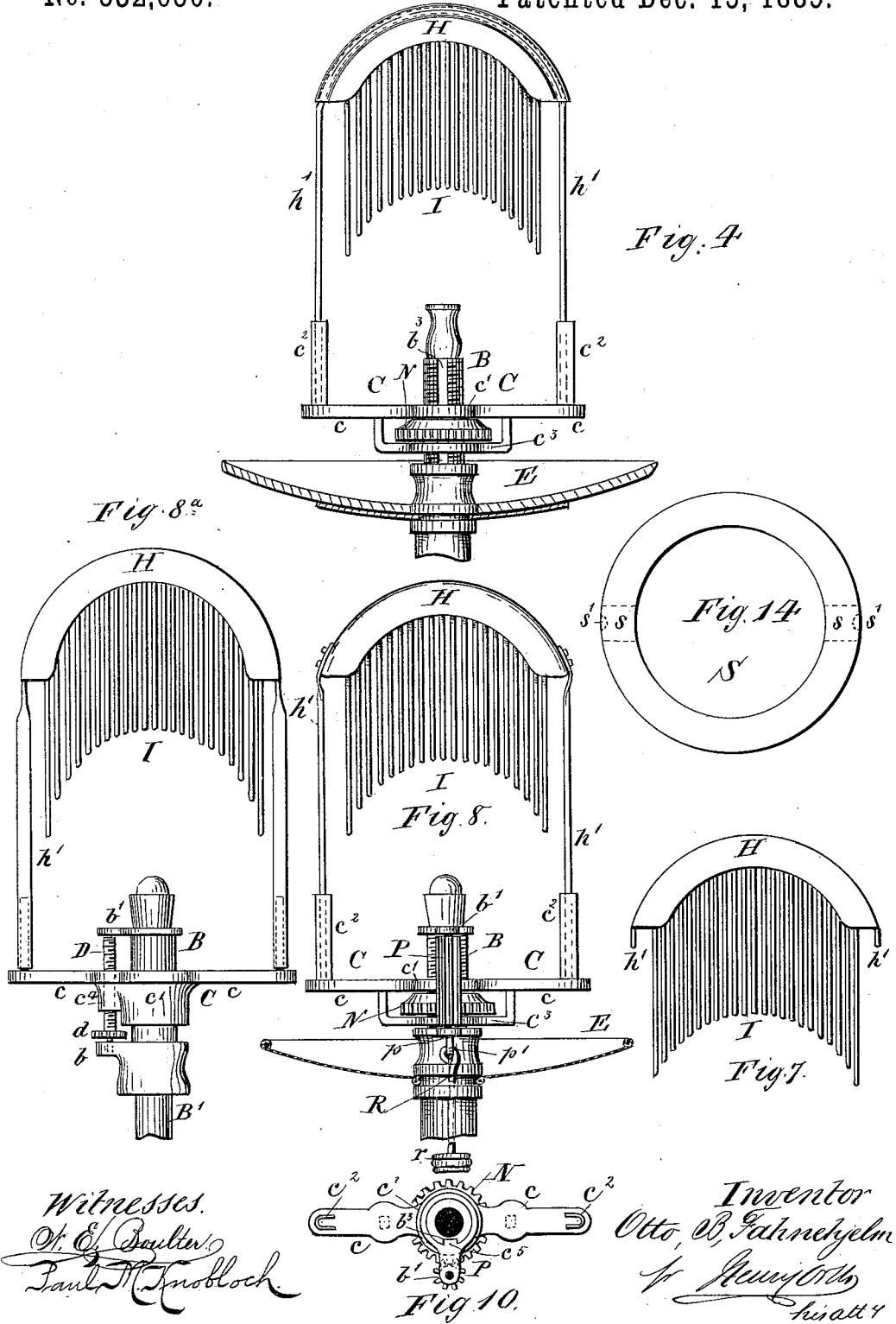

(No Model.)
O. B. FAHNEHJELM.
SUPPORT FOR HOLDING AND ADJUSTING INCANDESCING BODIES IN A GAS FLAME.
No. 332,650.   Patented Dec. 15, 1885.
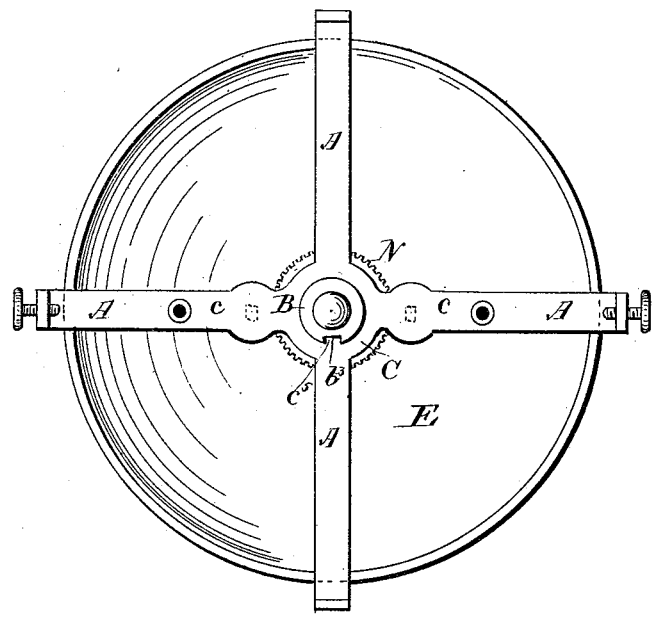
Fig. 9.
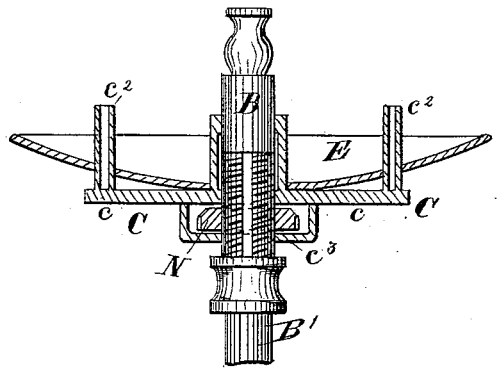
Fig. 11.
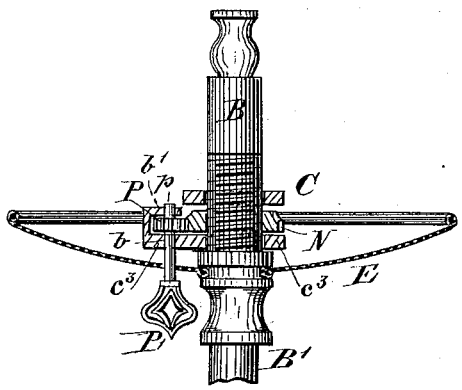
Fig. 8ᵇ.
Witnesses:
Inventor:
Otto B. Fahnehjelm (No Model.)  4 Sheets—Sheet 4.
O. B. FAHNEHJELM.
SUPPORT FOR HOLDING AND ADJUSTING INCANDESCING BODIES IN A GAS FLAME.
No. 332,650.  Patented Dec. 15, 1885.
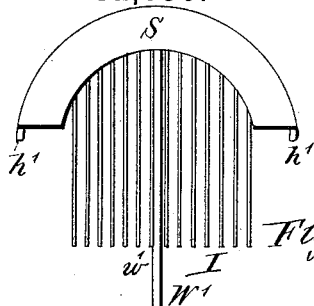
Fig. 12
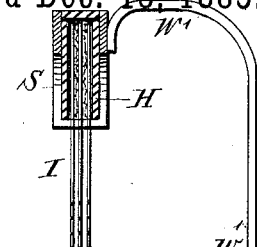
Fig. 13.
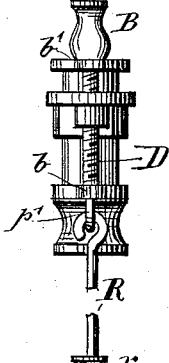
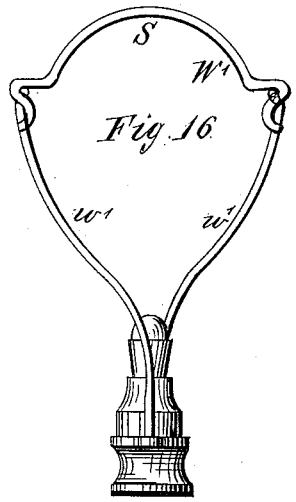
Fig. 16.
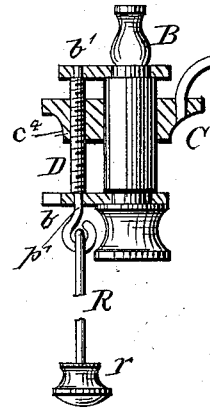
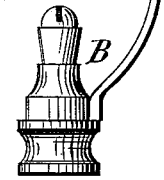
Fig. 15
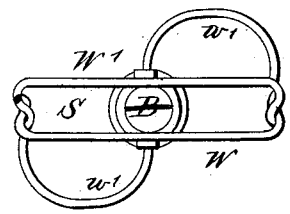
Fig. 17.
Witnesses:
H. E. Boulter
Paul M. Knobloch
Inventor
Otto B. Fahnehjelm
by Henry Orth
his atty.
N. PETERS, Photo-Lithographer, Washington, D. C.

UNITED STATES PATENT OFFICE.

OTTO B. FAHNEHJELM, OF NEW YORK, N. Y.

SUPPORT FOR HOLDING AND ADJUSTING INCANDESCING BODIES IN A GAS-FLAME.

SPECIFICATION forming part of Letters Patent No. 332,650, dated December 15, 1885.

Application filed February 17, 1885. Serial No. 156,159. (No model.)

*To all whom it may concern:*

Be it known that I, OTTO B. FAHNEHJELM, a subject of the King of Sweden, residing at New York, in the county of New York and State of New York, in the United States of America, have invented certain new and useful Improvements in Supports for Holding and Adjusting Incandescing Bodies in the Flame of a Gas; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to means or appliances for supporting an incandescing body in the flame of a jet of gas, and in means for adjusting the same vertically relatively to said flame.

The invention further relates to improvements in the holders for said incandescing bodies.

In an application for Letters Patent of the United States filed on or about August 4, 1884, Serial No. 140,666, I have shown and described devices for holding an incandescing body in the flame of a gas, and also means for adjusting the devices relatively to the flame; and the present invention consists, essentially, in improvements on the construction and operation of the devices referred to in the application aforesaid, and in combination therewith of other devices, substantially as hereinafter fully described.

In the accompanying drawings, Figure 1 is an elevation of one form of the appliances for suspending the incandescing body and adjusting the same. Fig. 2 is a vertical sectional view of Fig. 1, showing a slight modification in the adjusting devices. Fig. 3 is a section of the holder for the incandescing body shown in Figs. 1 and 2. Fig. 4 shows in elevation a further modification in the construction of the adjusting devices. Fig. 5 is an elevation of a burner provided with means for supporting the incandescing body. Fig. 6 is a vertical sectional view of Fig. 5. Fig. 7 is an elevation showing a modified construction of holder for the incandescing body. Figs. 8 and 8$^a$ are elevations showing modified constructions of holders and adjustable supports therefor. Fig. 8$^b$ is a view of a modified construction of the devices shown in Fig. 8. Fig. 9 is a top plan view of the burner and parts connected therewith, showing the shade-supporting arms formed on the cross-head C. Fig. 10 is a top plan view of Fig. 8, the holder H being removed. Fig. 11 is a further modification of the devices connected with the burner for supporting the incandescing body. Figs. 12 and 13 represent in elevation and section modified constructions of the holder for the incandescing body. Fig. 14 is a detail view thereof. Figs. 15 and 16 are elevations showing other modifications in the construction of the support for the incandescing body, and Fig. 17 is a plan view of Fig. 16.

Like letters of reference indicate like parts in the above figures of drawings.

The incandescing body I, to be suspended in the flame of a jet of water-gas, is composed of a series of needles or lamellæ of a mineral refractory substance or oxide, or compounds of such, cemented to a suitable holder in the manner as fully described in an application for Letters Patent filed on or about August 4, 1884, Serial No. 139,649.

The holder H for the needles or lamellæ may be of varied construction, and may be suspended in the flame of the gas from any suitable support. I have found, however, that it is best to support the incandescing body rigidly in the flame of the gas to prevent its oscillation therein. To this end the holder H may be constructed as shown in Figs. 1, 2, and 3. This holder consists of a segmental sheet-metal trough or casing, in the ridge of which is secured a wire, W, either by soldering or otherwise connecting said wire therewith, preferably by compressing the metal along the ridge around the wire W, whereby said wire is securely held in position. The ends of the wire project from the holder H a sufficient distance to form legs $h'$, for connection with the supporting devices attached to the burner B, hereinafter to be described.

Instead of connecting a wire, W, with the holder, the blank for the same may be of such a form as to have strips or extensions projecting from its opposite ends, which, when the holder is struck up and bent to shape, form flat legs $h'$, as shown in Fig. 7; or such flat legs may be riveted to the holder proper, as shown in Fig. 8; or said legs may be bent into a tube or socket, as shown in Fig. 8ª.

Instead of providing the holder with depending legs and connecting the holder detachably, with its supporting devices, on the burner, said supporting devices may be constructed with a bearing or seat to receive the holder, such seat becoming a fixture of or on the burner, from which the holder may be readily removed when the incandescing body is burned out. This arrangement materially simplifies the construction of the holder, and it may be made in a more economical manner. Referring to Figs. 12 to 17, the holder H has on its opposite ends a depending lug or leg, $h'$, and said holder is seated in a bearing or saddle, S, which may be obtained from a sheet-metal ring, Fig. 14, by bending two opposite segments thereof at right angles to intermediate plane surfaces, $s\ s$, upon which latter the ends of the holder H are seated, the incandescents I projecting through the slot formed between said bearing-surfaces. The depending lugs or legs $h'$ pass over the outside of the bearing-surfaces, or through notches $s'$, Fig. 14, and secure the holder H against end movement. This saddle S is provided with a leg or standard secured to the burner B in any suitable manner, or arranged on said burner for vertical adjustment.

Instead of making the saddle of sheet metal, it may be made of one or two wires, $W'$, bent and twisted into proper shape, one or both ends of which form supporting standards $w'\ w'$, connected with the burner.

The vertical adjustment of either of the described forms of holders, either on the burner B or the burner-pipe, may be effected in various ways by means of a vertically-adjustable cross-head, when the holder is provided with two legs, or from a spider when said holder has more than two legs. When the legs $h'$ of the holder H are cylindrical in cross-section, as in Figs. 1, 2, 3, and 4, the arms $c$, radiating from the sleeve $c'$ of the cross-head or spider C, are provided with socketed arms $c^2$, projecting vertically from the arms $c$. When, on the other hand, the legs $h'$ are flat, as in Figs. 7 and 8, the arms $c^2$ are slotted, as more plainly shown in Fig. 10. If the legs $h'$ are tubular, as in Fig. 8ª, the arms $c^2$ are cylindrical in cross-section; and, finally, when the bearings S, Figs. 12 to 17, are employed, the wire or wires may either be secured to the burner or burner-pipe or inserted in socketed arms and detachably connected with the cross-head C.

The vertical adjustment of the cross-head C may be effected by screw-threading the burner B, Fig. 4, and fitting thereon a nut, N, having a milled head or rim, said nut being applied between the cross-head C and a bearing-plate, $c^3$, depending therefrom. The sleeve $c'$ of the cross-head may here be dispensed with, as in Fig. 8, or it may be formed above the cross-head, as in Fig. 11, in order to give greater steadiness to the movements of the cross-head on the burner when forced up or down by the nut N. Of course it will be understood that the sleeve $c'$, when employed, or the opening of the cross-head through which the burner passes are not screw-threaded, and although fitted snugly to the threaded burner are free to move thereon.

Under some circumstances of use it will be found inconvenient to manipulate the nut N, by reason of its being out of easy reach, or by reason of structural features that do not afford easy access to the nut, and to manipulate the same I have devised the means shown in Fig. 8. The nut N is provided with a toothed periphery, and in bearings $b\ b'$, secured to or formed on the burner B at the limits of movement in either direction of the cross-head C, is mounted a pinion, P, the arbor $p$ of which projects below the lower bearing, $b$, and terminates in a loop, $p'$, to which is hooked a manipulating-rod, R, that carries a milled knob or button, $r$. The rod R may be made detachable from the pinion-arbor $p$, where such rod would hang in the way, and one such rod may be used for adjusting any number of incandescent bodies on their burners. When the burners are located at certain elevations, it may be found more or less difficult to hook the rods to the loop of the pinion-arbor, and in such cases the said arbor may terminate in a winged head, $P'$, Fig. 8ᵇ, and be manipulated, like the cock of a gas-burner, by means of a suitable key. The pinion P as shown in the drawings, is of considerable length, to provide stable bearings for its arbor. This result may also be attained by means of the form of bearing shown in said Fig. 8ᵇ, in which the bearing $b$ is U-shaped.

In Figs. 1, 12, and 13 I have shown another mode of adjusting the cross-head C, and instead of doing this by screw-threading the burner-pipe and employing a nut, N, I employ a screw, D, that operates in a threaded sleeve, $c^4$, projecting downwardly from one of the arms $c$ of the cross-head, said screw rotating in bearings $b$ and $b'$, secured to or formed on the burner B. The shank of the screw terminates in a loop, $p'$, to which is hooked the manipulating-rod R, or in a winged head, like the head P of the arbor $p$ of the pinion, Fig. 8ᵇ. When the burner is arranged within easy reach, the screw D may be provided with a milled head, $d$, as shown in Fig. 8ª.

To prevent the cross-head C from rotating on the burner when adjusted by the means shown in Figs. 4 and 8, or by any other cause, the burner B is provided with a vertical groove, $b^3$, Figs. 4, 8, 9, and 10, in which groove fits a lug or lip, $c^5$, projecting from the periphery of the opening in the cross-head C.

To avoid the gritty substance of the incandescents, should any portion thereof become detached or broken, from falling on the floor or carpets underneath the burners, I employ a drip cup or saucer, E, of any suitable material—such as metal—either plain or perforated, or a woven or reticulated metallic fabric, or glass, porcelain, terra-cotta, or other desired substance. This drip-cup E is applied to the burner according to the arrangement of the devices for manipulating the mechanism for adjusting the incandescent body relatively to the burner-flame. When the burner is within easy reach and the manipulating devices are arranged as in Figs. 4 and 11, the drip-cup E may be sprung or otherwise secured (according to the material of which it is composed) in an annular groove formed in the burner or the burner-pipe, or formed by two sections of such burner, or by the burner and its connecting-pipe B', as in Fig. 4; or the drip-cup may be supported from the cross-head C, it (the cup) being then provided with openings for the passage of the vertical arms $c^2$ of said cross-head, as in Fig. 11. The cup may also be supported from a flange or ring, F, secured in a groove formed in the burner, or by the latter and the burner-pipe, said flange or ring having radially-projecting lugs $f$, from which the cup E is supported, and forms at the same time the bearing $b$, for the shank of the screw D, or the arbor of the pinion P, as the case may be, as shown in Fig. 1. In this construction the ring F may also serve as a support for a globe or shade, suitable arms, A, being secured thereto, as shown in said Fig. 1; or said arms A may be secured directly to the cup E, when the material of which said cup is made admits of this, as will be readily understood. The supporting-arms for the shade may also be connected with or formed on the cross-head C, and may thus be adjusted with the incandescing body and relatively to the zone of incandescence, as shown in Fig. 9.

Under some conditions of use the support for the incandescing body may form an integral portion of the burner B, as shown in Figs. 5 and 6, said burner having radial arms $c$, terminating in vertical arms $c^2$, formed integral therewith.

I disclaim the mode of illuminating by incandescence described and claimed in my pending application for patent, filed on or about December 26, 1883, Serial No. 115,500.

I also disclaim the incandescent light covered by the claims of Letters Patent granted to me under date of February 17, 1885, No. 312,452.

I also disclaim the incandescing body as a new article of manufacture, or such a body in combination with a holder, or a holder and a chimney, as described and covered by the claims in my pending application for Letters Patent filed on or about August 4, 1884, Serial No. 139,649.

Having now described my invention, what I claim, and desire to secure by Letters Patent, is—

1. The combination, substantially as described, with a gas-burner, an incandescing body suspended above the burner-tip, and a support for said incandescing body connected with the burner below the tip, of a screw operating on the support to move the incandescing body toward and from the burner-tip, and means, substantially as described, for manipulating the screw from a distant point, for the purpose specified.

2. The combination, substantially as described, with a gas-burner, an incandescing body suspended above the burner-tip, a support for said incandescing body, and a drip-cup, both connected with the burner below the burner-tip, of a screw operating on the support to move the incandescing body toward and from the burner-tip and drip-cup, for the purpose specified.

3. The combination, substantially as described, with a gas-burner, an incandescing body suspended above the burner-tip, a support for said body, and a drip-cup connected with the burner below its tip, of a screw operating on the support to move the drip-cup and incandescing body toward and from the burner-tip, for the purpose specified.

4. The combination, substantially as described, with a gas-burner, an incandescing body suspended above the burner-tip, a holder for said body, and a drip-cup connected with the burner below the said tip, and a screw acting on the support arranged above the drip-cup, of means, substantially such as described, for rotating the screw from a point below the drip-cup, for the purpose specified.

5. The combination, substantially as described, with a gas-burner, an incandescing body suspended above the burner-tip, a support for said body, and a combined drip-cup and shade-holder connected with the burner below the burner-tip, of a screw operating on the support for the incandescing body to move the latter toward and from the burner-tip, for the purpose specified.

In testimony whereof I affix my signature in presence of two witnesses.

OTTO B. FAHNEHJELM.

Witnesses:
 GEO. J. DWIGHT,
 CARL DELLWIK.